United States Patent
Cao et al.

(10) Patent No.: US 8,810,976 B2
(45) Date of Patent: Aug. 19, 2014

(54) HARMONIC PROTECTION METHOD FOR CAPACITOR BANK

(75) Inventors: Liang Cao, Changzhou (CN); Hao He, Changzhou (CN); Jianyang Yu, Changzhou (CN); Jiaohong Luo, Changzhou (CN); Zhen Xu, Changzhou (CN)

(73) Assignee: Changzhou Current Supply Company of Jiangsu Electric Power Company, Changzhou (CN)

( * ) Notice: Subject to any disclaimer, the term of this patent is extended or adjusted under 35 U.S.C. 154(b) by 122 days.

(21) Appl. No.: 13/806,752

(22) PCT Filed: Jan. 30, 2011

(86) PCT No.: PCT/CN2011/070796
§ 371 (c)(1),
(2), (4) Date: Dec. 21, 2012

(87) PCT Pub. No.: WO2012/075725
PCT Pub. Date: Jun. 14, 2012

(65) Prior Publication Data
US 2013/0107399 A1  May 2, 2013

(30) Foreign Application Priority Data
Dec. 10, 2010 (CN) .......................... 2010 1 0582083

(51) Int. Cl.
*H02H 3/08* (2006.01)
*H02H 7/16* (2006.01)
(52) U.S. Cl.
CPC .. *H02H 3/08* (2013.01); *H02H 7/16* (2013.01)
USPC ........................................................ 361/15
(58) Field of Classification Search
USPC ........................................................ 361/15
See application file for complete search history.

(56) References Cited

U.S. PATENT DOCUMENTS

| | | | | |
|---|---|---|---|---|
| 4,667,152 A | * | 5/1987 | Hayes et al. | 324/76.24 |
| 6,496,342 B1 | * | 12/2002 | Horvath et al. | 361/65 |
| 2003/0067725 A1 | * | 4/2003 | Horvath et al. | 361/65 |

FOREIGN PATENT DOCUMENTS

CN    101814723 A  *  8/2010

OTHER PUBLICATIONS

English Machine Translation of CN101814723A, Cao et al., Aug. 2010.*
Harmonic Current and Voltage Distortion, Michael Z. Lowenstein, Ph.D., Nov. 1, 2002.*

* cited by examiner

*Primary Examiner* — Jared Fureman
*Assistant Examiner* — Kevin J Comber
(74) *Attorney, Agent, or Firm* — Anova Law Group, PLLC

(57) ABSTRACT

A harmonic protection method for a capacitor bank uses a harmonic protection apparatus, which includes a CPU unit, a current and voltage sampling unit, and a protection device. The CPU unit obtains effective value $I_1$ of fundamental wave current of the capacitor bank, and effective value $I_n$ of the n-th harmonic wave current of the capacitor bank, where n is harmonic order and ranges from 2 to $\infty$, and calculates the true effective value I of current of the capacitor bank by $$I = \sqrt{I_1^2 + \sum_{n=2}^{\infty} k_n I_n^2}$$

provided that $k_n = r_n/r_1$, $k_n$ is the n-th harmonic coefficient, $r_n$ is power consumption equivalent resistance of the capacitor bank for the n-th harmonic, $r_1$ is power consumption equivalent resistance of the capacitor bank at a fundamental frequency. When $I \geq 1.3 \, I_N$, the CPU unit controls the protecting device to disconnect the capacitor bank, provided that $I_N$ is a threshold current of the capacitor bank.

3 Claims, 1 Drawing Sheet

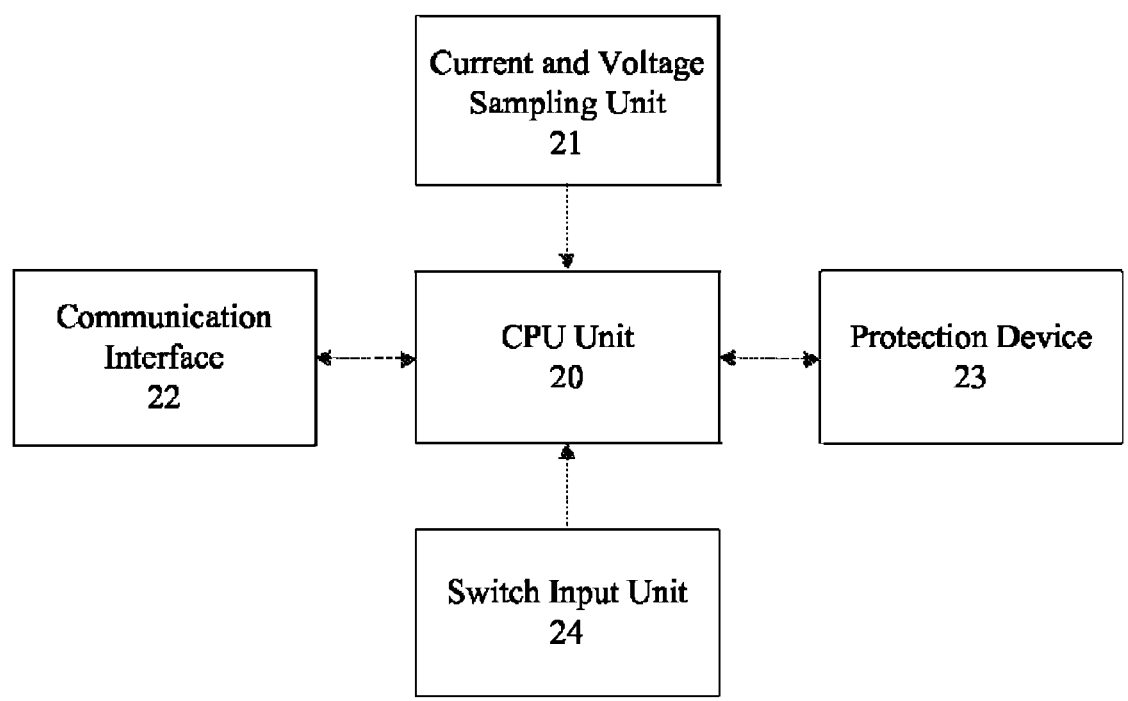

HARMONIC PROTECTION METHOD FOR CAPACITOR BANK

FIELD OF THE INVENTION

The present invention relates to a harmonic protection method for a power capacitor bank in a power system.

BACKGROUND

In recent years, with development of modern power system and the widespread use of power electronics technology, the electrical power load structure has undergone significant changes. A large number of non-linear power loads from applications of electric arc furnaces (EAFs), electric railways, thyristor-based voltage and frequency adjustment devices have become the main harmonic sources in a power grid, which input a large amount of harmonic currents into the power system and may lead to voltage waveform distortion in the power grid. Harmonics may, to different extents, adversely affect the normal operations of a variety of electrical equipment in the power system. Among them, the influence of harmonics on the capacitor bank is especially serious, which mainly includes increase of power loss in capacitor bank, harmonic resonance formed in the capacitor bank circuits, magnification of harmonic currents, and a shorter service life of capacitor bank.

Operating experience proves that harmonics in power grid are increasingly endangering capacitor bank and series reactor, and fire accidents caused by the failure of capacitor bank and series reactance in the substations occur frequently. The current methods used for the capacitor protections include differential voltage protection, differential current protection, overcurrent protection, overvoltage protection, and undervoltage protection, etc. However, only the fundamental waves of voltage and current are measured in these methods, the specific harmonic components are not measured and harmonic protections are not provided. Therefore, technical problems to be solved in this field include how to achieve a harmonic measurement and to send out an alarm signal or to disconnect a capacitor bank when the harm caused by the harmonic is more severe, such that the harmonic protection for capacitor can be realized to avoid the damage of the capacitor bank and to prevent the accidents from spreading or expanding.

The key to the harmonic protection for capacitor bank lies in the dense and accurate sampling of harmonics and the fast and accurate calculation. Currently, Discrete Fourier Transform (DFT) algorithm is often used in the calculation of harmonics:

$$x(t) = \sum_{n=1}^{\infty}(X_{Rn}\cos n\omega t - X_{In}\sin n\omega t)$$

where, $X_{Rn}$ is the real part of the n-th harmonic component, $X_{In}$ is the imaginary part of the n-th harmonic component.

$$X_{Rn} = \frac{2}{N}\sum_{k=1}^{N}x(k)\cos\left(nk\times\frac{2\pi}{N}\right)$$

-continued $$X_{In} = \frac{-2}{N}\sum_{k=1}^{N}x(k)\sin\left(nk\times\frac{2\pi}{N}\right)$$

where, N is the number of samples in every fundamental harmonic period. When n is taken on different values, the real part and the imaginary part of different frequency harmonic component can be calculated.

According to the formula $X_n = \sqrt{X_{Rn}^2 + X_{In}^2}$, the effective value of the n-th harmonic can be obtained. It is generally believed that the equation for calculating the current effective (or RMS) value of the capacitor bank is $$I = \sqrt{I_1^2 + \sum_{n=2}^{\infty}I_n^2},$$

It is found from the actual operation that the results from the described algorithm are often lower than the actual current RMS value, therefore protection device often cannot disconnect the capacitor bank promptly, and then the malfunction expands.

CONTENTS OF THE INVENTION

The technical problem to be solved by the present invention is to provide a harmonic protection method for capacitor bank by the real-time and accurate measurement of the actual RMS value of current through capacitor bank, so that the protective device can disconnect the capacitor bank accurately and promptly.

In order to solve the above-mentioned technical problem, the present invention provides a harmonic protection method for capacitor bank. The method uses a harmonic protection device for capacitor bank including: a CPU unit, a current and voltage sampling unit coupled to the CPU unit and used for current and voltage sampling of the capacitor bank, a protection device controlled by the CPU unit and used for disconnecting the capacitor bank.

The CPU unit obtains the RMS value of the fundamental current wave through the capacitor bank, $I_1$, and the RMS values of the nth harmonic current through the capacitor bank, $I_n$, and then calculates the true RMS value of current through the capacitor bank, I, according to the following equation (I):

$$I = \sqrt{I_1^2 + \sum_{n=2}^{\infty}k_n I_n^2}$$

where $k_n = r_n/r_1$, n is the harmonic order, and n ranges from 2 to ∞, $k_n$ is the nth harmonic coefficient, $r_n$ is the power consumption equivalent resistance of capacitor bank for the nth harmonic, $r_1$ is the power consumption equivalent resistance of capacitor bank at its fundamental frequency; $I_1$ is the RMS value of fundamental wave current through the capacitor bank; $I_n$ is the RMS value of the nth harmonic wave current through the capacitor bank. When $I \geq 1.3 I_N$, the CPU unit controls the protecting device to disconnect the capacitor bank; wherein $I_N$ is the threshold current through the capacitor bank.

Further, the harmonic protection device for capacitor bank includes a relay coupled to the CPU unit, and is used to control the circuit breaker and the isolating switch to disconnect the capacitor bank from the busbar.

Further, the CPU unit includes an analog-to-digital (A/D) conversion module. The A/D conversion module forms an analog acquisition system using a second-order passive RC anti-aliasing low-pass filter and a synchronous sampling A/D converter.

BRIEF DESCRIPTION OF THE DRAWINGS

In order to more easily and clearly understand the contents of the present invention, the present invention will be described in more details with particular embodiments and the accompanying drawings.

FIG. 1 is a circuit schematic diagram of a harmonic protection apparatus according to disclosed embodiments.

EMBODIMENTS

FIG. 1 shows a harmonic protection method for capacitor bank in the present embodiment. The harmonic protection apparatus for the capacitor bank includes a CPU unit 20, a communication interface 22 coupled to the CPU unit 20, a current and voltage sampling unit 21 coupled to the CPU unit 20 and used for sampling current and voltage of the capacitor bank, a protection device 23 coupled to the CPU unit 20 and controlled by the CPU unit 20 for disconnecting the capacitor bank, a switch input unit 24 coupled to the CPU unit 20 and used for detecting the location information of the circuit breaker and isolating switch, etc. The protection device 23 includes a relay coupled with the CPU unit 20 and used to control the circuit breaker and isolating switch to disconnect the capacitor bank from the busbar.

The CPU unit obtains the RMS value $I_1$ of fundamental wave current of the capacitor bank, and the RMS value $I_n$ of the n-th harmonic wave current of the capacitor bank from the current and voltage sampling unit. The CPU unit then calculates the true RMS value I of the current of the capacitor bank, according to the following equation:

$$I = \sqrt{I_1^2 + \sum_{n=2}^{\infty} k_n I_n^2}$$

wherein $k_n = r_n/r_1$, n is the harmonic order, and n ranges from 2 to ∞, $k_n$ is the n-th harmonic coefficient, $r_n$ is power consumption equivalent resistance of capacitor bank for the n-th harmonic, $r_1$ is power consumption equivalent resistance of capacitor bank at its fundamental frequency; $I_1$ is the RMS value of fundamental wave current of the capacitor bank; $I_n$ is the RMS value of the n-th harmonic wave current of the capacitor bank. When $I \geq 1.3 I_N$, the CPU unit controls the protection device 23 to disconnect the capacitor bank, where $I_N$ is the threshold current of the capacitor bank.

According to harmonic overload testing on a 66 kV reactor as shown in the table below, it can be determined that the value of the harmonic coefficient, $K_3$, is 1.16043 for the 3rd harmonic and the value of the harmonic coefficient, $K_{13}$, is 3.00258 for the 13th harmonic. It shows that the conventional calculation of the true RMS value of current containing the harmonic component has a larger error value. By using the algorithm for capacitor harmonic protection in the present invention, the actual RMS value of the current of the capacitor bank can be accurately measured, which ensures that the protective device can disconnect the capacitor bank more accurately and promptly.

| | Harmonic number n | | | | | |
|---|---|---|---|---|---|---|
| | 2 | 3 | 4 | 5 | 6 | 7 |
| $K_n$ | 1.06548 | 1.16043 | 1.28399 | 1.425691 | 1.57317 | 1.73326 |
| | Harmonic number n | | | | | |
| | 8 | 9 | 10 | 11 | 12 | 13 |
| $k_n$ | 1.91285 | 2.10560 | 2.31538 | 2.52262 | 2.76192 | 3.00258 |

CPU unit 20 includes: an analog-to-digital conversion module, a microprocessor module, and other specific functions such as I/O drive, protection algorithm, setting event management, fault recording, man-machine interface, back-end communication and USB HOST interface, etc. CPU unit 20 also includes a modules providing real-time clock and GPS time input interface and used as a clock source of the entire apparatus.

The analog-to-digital (A/D) conversion module uses a second-order passive RC anti-aliasing low-pass filter and a 16-bit, 6-channel simultaneous sampling A/D converter to form an analog acquisition system. It provides 15 alternate-current sampling channels. Given that enough number of alternate-current sampling channels are available, the 13th channel to the 15th channel are used as interleaved sampling channels. Error detection mechanism for the data channel between the A/D chip and the CPU is designed to avoid data misdetection caused by the errors in the data channels.

The microprocessor module can include the MPC8247 of the Freescale PowerQuicc II processor family, which supports CPU frequencies up to 400 MHz and low power consumption (0.8 W at 266 MHz). The MPC8247 has a dual-core architecture: an embedded PowerPC 603e core and a separate communications processor module (CPM). The core (1.5V) and I/O (3.3V) have separate power supplies. A 64-bit data bus and a 32-bit address bus (60x bus) support 64, 32, 16, and 8 bit devices.

Therefore, the present invention not only can achieve conventional overcurrent and overvoltage protection functions, but also can provide a real-time calculation for each harmonic wave current and voltage from the $2^{nd}$ harmonic to the $13^{th}$ harmonic to achieve single harmonic current protection, single harmonic voltage protection, full current harmonic protection, and full voltage harmonic protection. A better protection for the capacitor bank may be realized.

Obviously, the above embodiments are only examples for clearly describing the present invention, and cannot be used to limit the scope of the present invention and embodiments. It will be apparent to those skilled in the art that there could be variations and modifications to the disclosed embodiments, and it is neither necessary nor possible to describe all possible embodiments. Any obvious variations or modifications without departing from the spirit still fall under the scope of the present invention.

INDUSTRIAL APPLICABILITY

The disclosed harmonic protection method for capacitor bank according to the present invention, based on different resistances of capacitor and reactor group for the different order of harmonics and the formula:

$$I^2 R_1 = I_1^2 R_1 + \sum_{n=2}^{\infty} I_n^2 R_n,$$

reveals that the power consumption equivalent resistance of reactor changes along with the different order harmonics. When this concept is applied to the harmonic protection device for capacitor bank, the power consumption of capacitor bank or reactor group may be calculated for the different order Harmonic component. Further, according to the provisions of Chinese GB50227—1995 "Design specification for shunt capacitors", the protection device may automatically disconnect the capacitor bank or the reactor group when the sampling current is more than 1.3 times of the threshold current of the protection device.

Therefore, the present invention not only can achieve conventional overcurrent and overvoltage protection functions, but also can provide a real-time calculation for each harmonic wave current and voltage from the $2^{nd}$ harmonic to the $13^{th}$ harmonic to achieve single harmonic current protection, single harmonic voltage protection, full current harmonic protection, and full voltage harmonic protection. A better protection for the capacitor bank may be realized.

What is claimed is:

1. A harmonic protection apparatus for a capacitor bank, the harmonic protection apparatus including:
    a CPU unit;
    a current and voltage sampling unit coupled to the CPU unit and configured to provide current and voltage sampling of the capacitor bank; and
    a protection device controlled by the CPU unit and used for disconnecting the capacitor bank,
wherein
    the CPU unit obtains effective value $I_1$ of fundamental wave current of the capacitor bank, and effective value $I_n$ of the n-th harmonic wave current of the capacitor bank, where n is harmonic order an ranges from 2 to $\infty$, and calculates the true effective value I of current of the capacitor bank according to the equation of $$I = \sqrt{I_1^2 + \sum_{n=2}^{\infty} k_n I_n^2}$$

provided that $k_n = r_n/r_1$, $k_n$ is the n-the harmonic coefficient, $r_n$ is power consumption equivalent resistance of the capacitor bank for the n-the harmonic, $r_1$ is power consumption equivalent resistance of the capacitor bank at a fundamental frequency; and
    when $I \geq 1.3\, I_N$, the CPU unit controls the protecting device to disconnect the capacitor bank, provided that $I_N$ is a threshold current of the capacitor bank.

2. The harmonic protection apparatus according to claim 1, wherein the harmonic protection apparatus further includes:
    a relay coupled to the CPU unit and used to control a circuit breaker and an isolating switch to disconnect the capacitor bank from a busbar.

3. The harmonic protection apparatus according to claim 2, wherein the CPU unit further includes:
    an analog-to-digital conversion module,
    wherein the analog-to-digital conversion module uses a second-order passive RC anti-aliasing low-pass filter and a synchronous sampling A/D converter from an analog acquisition system.

* * * * *